May 20, 1930. R. G. GUNDERSEN ET AL 1,759,351
HEAT EXCHANGING APPARATUS
Filed April 7, 1928 2 Sheets-Sheet 1
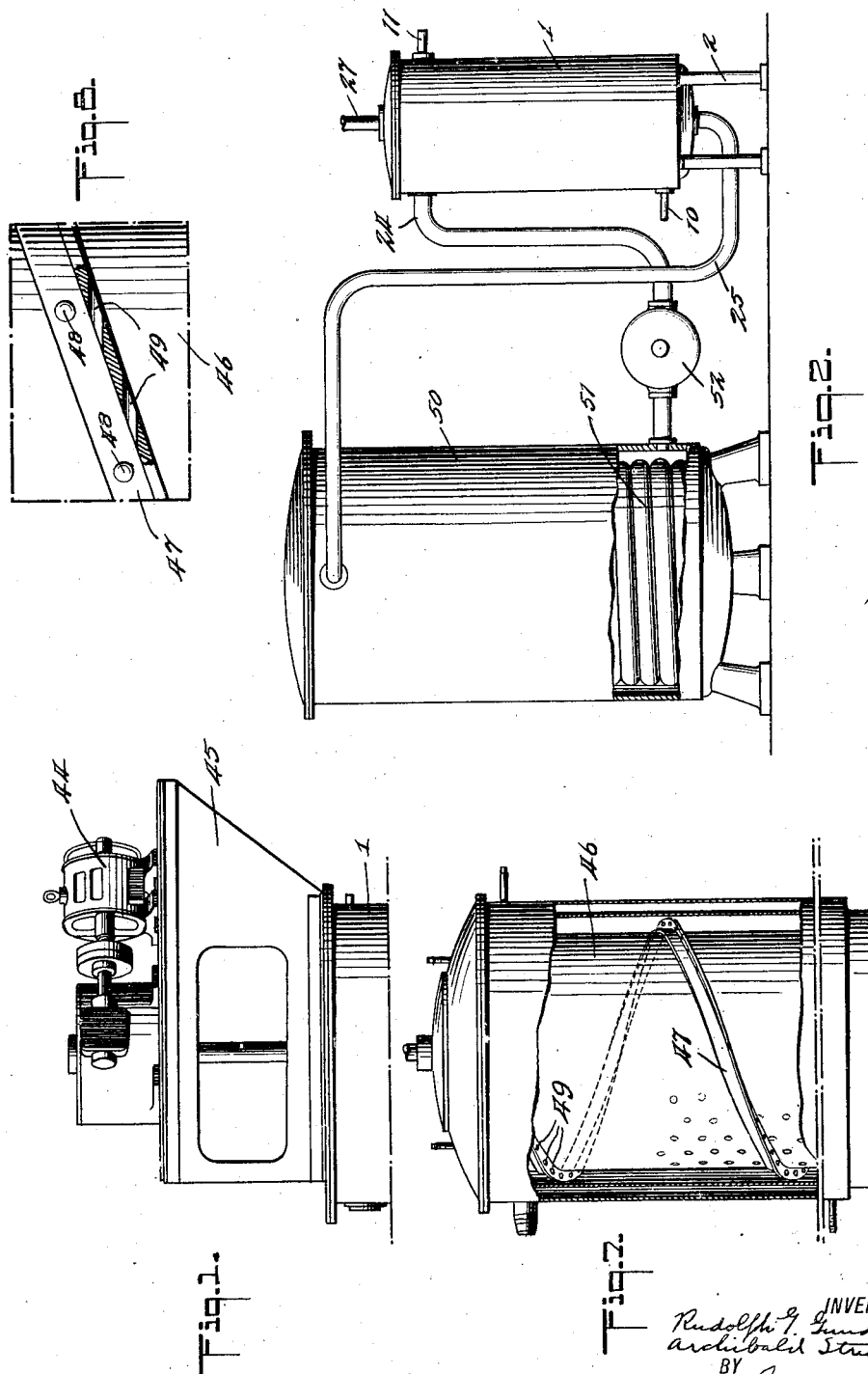
INVENTORS
Rudolph G. Gundersen
Archibald Struthers
BY
ATTORNEY

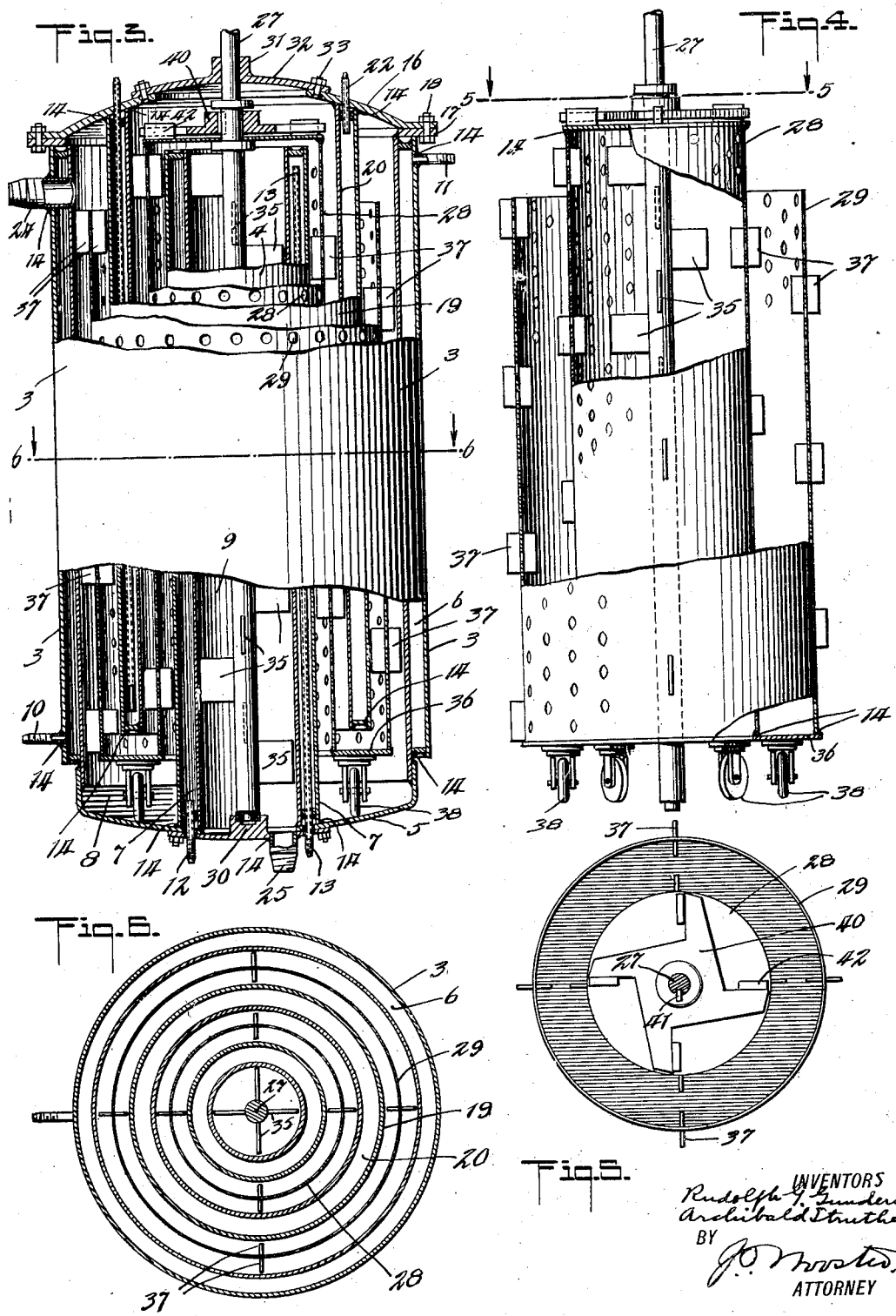

Patented May 20, 1930

1,759,351

UNITED STATES PATENT OFFICE

RUDOLPH G. GUNDERSEN, OF NEW YORK, AND ARCHIBALD STRUTHERS, OF YONKERS, NEW YORK, ASSIGNORS TO NEW YORK ENGINEERING COMPANY, OF NEW YORK, N. Y., A CORPORATION OF NEW YORK

HEAT-EXCHANGING APPARATUS

Application filed April 7, 1928. Serial No. 268,253.

This invention relates to heat exchanging apparatus for rapidly and uniformly cooling or heating liquid and semi-solid viscous substances which, because of low heat conductivity and their nature, are difficult to handle in ordinary apparatus for such purposes.

An object of the invention is to facilitate the rapid and uniform cooling of oils and other viscous substances.

Another object of the invention is to cool such substances uniformly and continuously by keeping the cooling surfaces clear of solidified material.

Another object of the invention is to provide a simple and efficient cooler in which the parts are easily accessible for cleaning or adjustment.

The invention is particularly useful for cooling oils, petrolatum, asphaltum, paraffin, and other viscous substances used in the manufacture of electrical cables. It is a common practice to insulate electrical cables by immersing them in a heated bath of such a substance until the cable core is thoroughly impregnated. When the cable has been treated for a sufficient time, the bath should be cooled rapidly and uniformly in order to permit the substance to set properly in the interstices of the cable without after bleeding. Rapid cooling is also essential from an economic standpoint in carrying out the operation on a commercial scale. The cooling can be accomplished quickly and efficiently by circulating the impregnating substance such as petrolatum through a cooling or refrigerating apparatus and then back to the impregnating tank so that the temperature of the bath, and consequently that of the impregnated cable, is rapidly reduced to the temperature to which the cable is subjected in actual use. Ordinary coolers, such as coolers of the spiral coil type, are entirely unsuited for this work because they do not effect a uniform cooling but allow viscous substances to coagulate locally and collect on the chilled walls of the cooling coils to such extent as not only to retard heat exchange but to obstruct the flow. Also, it is difficult to remove congealed material from spiral coils. According to the present invention, however, viscous substances are cooled rapidly and uniformly while in circulation through the cooling apparatus and the impregnating tank, so the temperature of the entire bath and the cable immersed therein is easily controlled.

According to the invention, the substance to be cooled is circulated through a container having a plurality of long, narrow compartments which are partitioned by water-tight cooling jackets and are so arranged that the substance will flow continuously from one compartment to another. The novel arrangement of the several compartments and cooling jackets provides a relatively large cooling surface within a small, compact space. Means are provided for removing solidified material from the cooling surfaces during its flow through the apparatus to maintain rapid heat interchange by preventing such deposit of solidified material on the cooling surfaces as act as a heat insulator, or clog the flow area.

In the preferred form of the invention, the cooling apparatus comprises a plurality of concentric cylinders alternately inverted with one end open and the opposite end closed. The telescoping ends of the cylinders are separated a sufficient distance to provide a free passage from one to the other. The side walls of the cylinders are surrounded by water-tight jackets through which a cooling fluid is circulated. The viscous substance to be cooled is preferably admitted at the top of the outermost cylinder, flows progressively through the several compartments between the cooling jackets, and is withdrawn from the bottom of the innermost cylinder. A feature of the invention resides in a novel scraping mechanism comprising a plurality of vanes which are rotated in the several compartments to scrape off the material which congeals on the chilled walls of the cylinders, and also keeping the material stirred up. The paddles or vanes are driven by a motor through a novel loose driving connection which allows for expansion and contraction due to changes in temperature. The ends of the cooling jackets and all other joints in the walls of the cooler are welded, thereby eliminating mechanical joints and preventing the cooling fluid from coming in contact with the viscous substance.

In the accompanying drawings similar reference characters designate corresponding parts in the several views.

Fig. 1 is a fragmentary elevation showing the outer casing and the motor for rotating the stirring mechanism;

Fig. 2 is an elevation showing the cooler connected to a cable impregnating tank, with a pump for circulating the impregnating substance;

Fig. 3 is a vertical section through the cooler showing the arrangement of the concentric cylinders, water jackets and stirring mechanism;

Fig. 4 is a vertical section of the mechanism for scraping a viscous substance in the cooler, certain parts being broken away to simplify the showing;

Fig. 5 is a detail view showing the driving connection between the central rotatable shaft and other parts of the scraping mechanism;

Fig. 6 is a cross sectional view taken on the line 6—6 of Fig. 3.

Fig. 7 is a vertical section showing a modified form of stirring and scraping mechanism; and Fig. 8 is a detail, partly in section, of the mechanism shown in Fig. 7.

Referring to the drawings, the invention in its preferred form includes a cylindrical outer casing 1 mounted on suitable standards 2, as shown in Figs. 1 and 2. The cooling apparatus, which is contained within the casing 1, includes a pair of concentric double-wall cylinders 3 and 4, respectively, having a rounded bottom wall 5, as shown in Fig. 3. The double walls of the larger outer cylinder 3 form a water-tight cylindrical jacket 6 extending substantially the length of the cylinder. The double walls of the inner smaller cylinder 4 form a similar water-tight jacket 7. These cylinders thus form an outer chamber 8 and an inner chamber 9. The inner cylinder 4 is open at the top, as shown in Fig. 3, providing an open passageway between the chambers 8 and 9.

Water or any other cooling fluid from any suitable source is supplied to the jacket 6 through an intake pipe 10 disposed adjacent the bottom thereof, and is withdrawn through an outlet pipe 11 adjacent the upper edge of the jacket. In this way, cold water forced through the pipe 10 will rise in the jacket 6 and flow out through the outlet pipe 11, so that fresh cold water rises continuously in the jacket 6 and passes out through the outlet pipe somewhat warmed by the heated substance which is circulated in the chamber 8 as hereinafter described. Cold water or other cooling fluid is supplied to the jacket 7 through an intake pipe 12 in the bottom of the jacket, and is withdrawn through an outlet pipe 13. The outlet pipe 13 reaches to a point adjacent the top of the jacket 7 so that the water is withdrawn from the top of the jacket although the inlet and outlet pipes both project through the bottom wall 5 of the cylinder. The upper and lower edges and all other joints in the cooling jackets are welded as at 14 in order to make the jackets water-tight. This precaution is taken in order to prevent the water from leaking even in small quantities into the chambers 8 and 9.

An annular cover 16 is clamped on the upper flange 17 of the cylinder 3 by means of bolts 18. A cylindrical double-wall cylinder 19 having its lower end open is suitably fastened to the under side of the cover 16 in such a position that it will project into the chamber 8 concentric with the cylinders 3 and 4 when the cover is clamped in place as shown in Fig. 3, thereby dividing the chamber 8 into two compartments. The double walls of the cylinder 19 form a water-tight cooling jacket 20. Cold water is supplied to the jacket 20 through an intake pipe 21 which extends longitudinally through to the bottom of the jacket with its lower end open, and is withdrawn through an outlet pipe 22 which projects part way into the upper end of the jacket. In this way the fresh cold water will always enter at the bottom of the jacket 20, rise steadily in the jacket, and flow out through the outlet pipe 22. The upper and lower edges and all other joints in the jacket 20 are also welded, as shown in Fig. 3, to prevent leakage. It will be seen that the three concentric cylinders of the cooler telescope one inside the other, the outermost cylinder 3 and the innermost cylinder 4 having their lower ends closed and the intermediate cylinder 19 having its lower end open. This construction provides three long, narrow compartments which are connected to form a long tortuous course between the cooling jackets.

The oil or other viscous substance is admitted at the top of the outermost cylinder 3 through an intake pipe 24 which passes through the cooling jacket 6 and is welded thereto, as shown in Fig. 3. The viscous substance which is thus admitted through the pipe 24 will flow in the chamber 8 on both sides of the cooling jacket 19 and will overflow through the open upper end of the inner cylinder 4 into the chamber 9. The substance in the chamber 9 is withdrawn through an outlet pipe 25 in the rounded bottom wall 5 of the cylinder. The viscous substance entering through the pipe 24 descends continuously in the compartment between the outer cylinder 3 and the cooling jacket 19 and rises continuously in the compartment between the cooling jacket 19 and the inner cylinder 4 so that it flows in contact with the cooling jackets 6, 19, and 7 before it overflows into the inner chamber 9. The cooling jacket 19 thus not only provides a greater cooling area for the heated viscous substance but also prevents the substance from flowing directly through the inlet pipe 24 and over the top of the inner cylinder 4 after the chamber 8 becomes filled.

Unless prevented, the chilled material will congeal on the cool walls, and prevent both circulation and heat exchange. The preferred form of scraping mechanism, shown in Figs. 3 and 4, comprises a central shaft 27 and a pair of concentric perforated vane cylinders 28 and 29 respectively. The shaft 27 is journaled at its lower end in a bearing 30 in the bottom wall 5 at the common axis of the concentric cylinders, and is journaled at its upper end in a bearing 31 centrally located in a cap or cover 32 which is clamped on the cover 16 by means of bolts 33. A plurality of flat vanes 35 are mounted in staggered relation on the shaft 27 so that they extend transversely into the chamber 9. When the shaft 27 is rotated these paddles or vanes scrape the viscous substance in the chamber 9 from all parts of the inner wall of the cylinder 4. The perforated cylinders 28 and 29 are connected together at their lower ends by means of an annular base portion 36 which may be formed integral with the side walls of these cylinders or may be fastened thereto in any suitable manner. The perforated cylinders 28 and 29 are arranged to fit inside the chamber 8 and are spaced far enough apart to permit the water jacket 19 to be inserted freely between them. A plurality of vanes 37 are disposed spirally or in other staggered relation on the cylinders 28 and 29 and project transversely on both sides a sufficient distance to span the space between the cylinder 19 and the cylinders 3 and 4, respectively, to scrape the cooling surfaces. The vane cylinders are flexible enough so that they yield when local vane scraping pressure becomes too high, or the vanes may be somewhat flexible, or both. The vanes in each or any compartment may be inclined relatively to the direction of rotation and of flow so as to force the circulation of material from compartment to compartment independently of a pump, or in aid of the pump. A plurality of rollers 38 are mounted on the base portion 36 of this mechanism so that it may rotate as a unit on the bottom wall 5. A spider 40 is keyed at 41 to the upper end of the shaft 27, and comprises a plurality of horizontally projecting arms which contact loosely with lugs 42 on the top of the perforated cylinder 28 whereby the cylinders 28 and 29 are caused to rotate with the shaft 27.

In assembling the apparatus described above, the carriage comprising the perforated cylinders 28 and 29 is inserted in the chamber 8 with the rollers 38 resting on the bottom wall 5. The central shaft 27 is then inserted in the chamber 9 with its lower end in the bearing 30 and the arms of the spider 40 loosely engaging the lugs 42. The cover 16 is next lowered into place with the cylinder 19 projecting downwardly into the chamber 8 in the compartment between the perforated cylinders 28 and 29. The cap or cover 32 is then placed in position, closing the opening in the outer cover 16. The shaft 27 is rotated at any desired speed by means of a motor 44 mounted on a bracket 45 at the top of the outer casing 1, as shown in Fig. 1. As the shaft 27 rotates the paddles or vanes 35 will mix the viscous substance in the chamber 9 and scrape it from the inner wall of the cylinder 4. The rotation of the shaft 27 is likewise communicated to the perforated cylinders 28 and 29 through the spider 40 and lugs 42 so that the vanes 37 will continuously stir and scrape the viscous substance in the chamber 8 on both sides of the cylinder 19. The perforations in the cylinders 28 and 29 are large enough to permit the viscous substance to flow freely through them and fill all parts of the chamber 8.

Instead of the vane cylinders 28 and 29, the modified construction shown in Figs. 7 and 8 may be employed. In this construction the stirring and scraping mechanism comprises a perforated cylinder 46 about which is bent a spiral strip 47. The spiral 47 may consist of a bent strip of angle-iron having one face fastened to the cylinder 46 by means of suitable studs 48, and the other face spanning the space between the cylinder 46 and the wall of the adjacent water jacket. The spiral 47 is preferably provided in the horizontally disposed portion with perforations 49 in order to permit the viscous substance to flow freely through the spiral during the scraping and agitating operation.

In Fig. 2 the cooler is shown connected to a cable impregnating tank 50 for continuously cooling the cable impregnating substance. An electrical cable 51 is coiled inside the tank 50 in the usual manner and the impregnating substance within the tank 50 is heated to the proper temperature for a sufficient length of time to permit the substance to thoroughly impregnate the cable. The heating of the substance may be accomplished by means of any suitable apparatus, not shown. When the cable is thoroughly impregnated the cooling apparatus is set in operation. The shaft 27 is rotated by starting the motor 44, shown in Fig. 1, and the cold water is circulated through the water jackets in the manner described above. The impregnating substance is circulated through the tank 50 and the compartments of the cooler by means of a circulating pump 52. The heated viscous substance from the impregnating tank is admitted through the pipe 24 to the cooler where it is uniformly cooled in the manner described above. The cooled material scraped off by the vanes mixes with and to some extent remelts in the warmer material not directly contacting with the cooler surfaces, so a very homogeneous cool mixture results without clogging the vanes. After cooling the substantially homogeneous substance emerges from the cooler through the pipe 25 and again enters the top of the impregnating tank. The operation is continued until the impregnating substance within the tank 50 has been cooled to the desired temperature and the substance is properly set in the interstices of the cable. The cooling is accomplished rapdily and efficiently and requires no maintenance or personal attention except to start the apparatus and to stop it at the completion of the cooling operation. The cooler is simple in construction and efficient in operation and may be readily disassembled for cleaning or other purposes.

It will be evident that the apparatus is broadly a heat exchanger, and is capable of various modifications and adaptations for cooling or heating liquids which are not specifically described, but are included within the scope of the appended claims.

The invention claimed is:

1. In a cooling device, a plurality of concentric cylinders, means for supplying a substance to be cooled to one cylinder, an opening in said cylinder to admit the substance to the adjacent cylinder, an outlet in said last mentioned cylinder, a channel for receiving a cooling fluid disposed between said cylinders and inlet and outlet pipes extending through the same end of said channel, one of said pipes extending substantially to the opposite end of the channel pipe whereby said fluid is admitted and withdrawn from different parts of said channel.

2. In a device for cooling viscous substances, a plurality of concentric cylinders, means for supplying the substance to be cooled to one cylinder, an opening in said cylinder to admit the overflow to the adjacent cylinder, an outlet in said last mentioned cylinder, a channel for receiving a cooling fluid disposed between said cylinders, a scraping mechanism having a plurality of vanes disposed in said cylinders, and means for driving said mechanism.

3. In a device for cooling viscous substances, a plurality of concentric cylinders having openings leading successively from one cylinder to another, means for supplying the substance to be cooled to one cylinder, means for flowing said substance from cylinder to cylinder, cooling jackets surrounding the side walls of said cylinders, a shaft rotatably mounted at the common axis of said cylinders, and a plurality of vanes driven by said shaft in each cylinder.

4. In a device for cooling viscous substances, a receptacle for receiving the substance to be cooled comprising a plurality of concentric cylinders each having one end open to admit the substance from one cylinder to another, means for supplying the substance to be cooled to one cylinder, means for withdrawing said substance from another cylinder, cooling jackets surrounding the side walls of said cylinders, vane supports in each cylinder, vanes carried thereby, and a driving connection including arms mounted on said shaft and adapted to engage and rotate said vane supports.

5. A cooling device comprising a casing, a shaft centrally mounted therein, a cover, alternating concentric annular cooling jackets carried by the cover and the casing bottom to form a series of connected annular compartments, means for flowing material through said compartments, a vane carrying cylinder in each annular compartment, vanes on said cylinders cooperating with the cooling walls of the compartment, and means for rotating said vane cylinders from said shaft.

6. A cooling device comprising a casing, a shaft centrally mounted therein, a cover, alternating concentric annular cooling jackets carried by the cover and the casing bottom to form a series of connected annular compartments, means for flowing material through said compartments, a vane carrying cylinder in each annular compartment, vanes on said cylinders cooperating with the cooling walls of the compartment, adjacent cylinders being connected below the intervening cooling jacket, rollers supporting said cylinders above the casing bottom, and means for driving said cylinders from said shaft.

7. In a device for cooling viscous substances, a receptacle comprising a pair of concentric cylinders having their lower ends closed and their adjacent upper ends open, means for supplying the substance to be cooled to the top of one cylinder, an outlet in the other cylinder for withdrawing the overflow from the first mentioned cylinder, water-tight jackets for receiving a cooling fluid surrounding the side walls of said cylinders, a shaft rotatably mounted at the common axis of said cylinders, a plurality of vanes on said shaft projecting into the inner cylinder to mix the substance therein, a carriage comprising a pair of concentric perforated cylinders rotatable with said shaft and extending into the outer cylinder, rollers on said carriage resting on the bottom of said outer cylinder, a plurality of vanes on said perforated cylinders, a cover for the top of said receptacle, and a cylindrical water-tight jacket for receiving a cooling fluid mounted on said cover in a position to enter said receptacle between said perforated cylinders.

8. A device for mixing viscous and other substances comprising in combination, a container for the substance to be mixed, a plurality of flexible concentric cylinders in said container having openings therein to permit the substance to flow freely between them, projecting portions on said cylinders, and means for rotating said cylinders about their common axis.

9. A device for mixing viscous and other substances comprising in combination, a container for the substance to be mixed, a plurality of concentric cylinders in said container having openings therein to permit the substance to flow freely between them, projecting portions on said cylinders for agitating said substance, an annular base connecting the lower ends of said cylinders, and means for rotating said cylinders about their common axis.

Signed at New York in the county of New York, and State of New York this 28th day of March, 1928.

RUDOLPH G. GUNDERSEN.

Signed at Marion in the county of Grant, and State of Indiana this 2nd day of April, 1928.

ARCHIBALD STRUTHERS.